Oct. 25, 1966 H. W. LONDON 3,280,496
FISHING ROD ALARM
Filed Sept. 15, 1964

INVENTOR.
HARVEY W. LONDON
BY
John B. Dickman III
AGENT

United States Patent Office 3,280,496
Patented Oct. 25, 1966

3,280,496
FISHING ROD ALARM
Harvey W. London, 8110 Summerdale Ave., Philadelphia, Pa.
Filed Sept. 15, 1964, Ser. No. 396,520
1 Claim. (Cl. 43—17)

This invention relates to a fishing rod alarm and has as its primary object the provision of an attachment which may be applied to any conventional fishing pole which will indicate either visually, or audibly, or both, a strike by a fish.

A further object of this invention is the provision of a device of this character which, when attached to a fishing rod, may permit the latter to be left unattended, relieving the fisherman for relaxation or other purposes, but which will immediately attract his attention in a suitable manner either by the ringing of an alarm or the flashing of a light, or both as desired, as soon as a fish takes the bait or strikes.

A further object of this invention is the provision of a device of this character which may be readily attached to any present fishing rod or pole, and which is small and completely self-contained.

Still another object of the invention is the provision of a device of this character which may be adjusted to provide either an audible or a visual signal or both at the option of the fisherman.

A still further object of the invention is the provision of a device of this character which is sturdy and durable in construction, reliable and efficient in operation, and relatively simple and inexpensive to manufacture, and which is easy of attachment to any conventional fishing rig.

Other objects reside in the combinations of elements, arrangements of parts, and features of construction, all as will be more fully pointed out hereinafter and disclosed in the accompanying drawing wherein there are shown preferred embodiments of this inventive concept.

In the drawing.

Similar reference characters refer to similar parts throughout the several views of the drawing.

Figure 1:
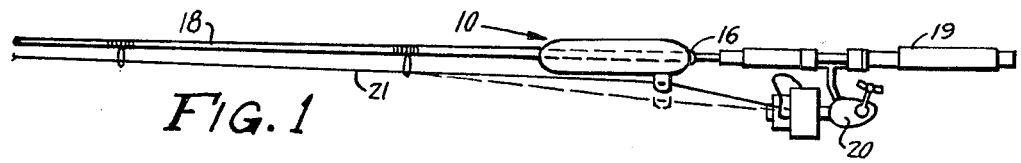
FIGURE 1 is a side elevational view of one form of device constructed in accordance with the instant invention shown as attached to a conventional fishing rod and reel assembly.

Referring now to the drawings in detail, the device of the instant invention is generally indicated at 10 and comprises a casing 11 of generally tubular construction having tapered ends 12 and 13, one of which is provided with a socket 14 and an opening 15 through which projects a light bulb 16. The casing may be separable either along a longitudinal axis or transversely as desired in any conventional manner. Positioned on one side of the casing are a pair of spring clips 17 of conventional design which are adapted to be engaged with a fishing rod or pole 18, of any desired conventional construction, and which include a handle 19 and a conventional reel 20 from which a line 21 extends to a baited hook (not shown). The rod may be supported manually or may be inserted in any suitable socket and left unattended, when provided with the alarm of the instant invention.

Figure 2:
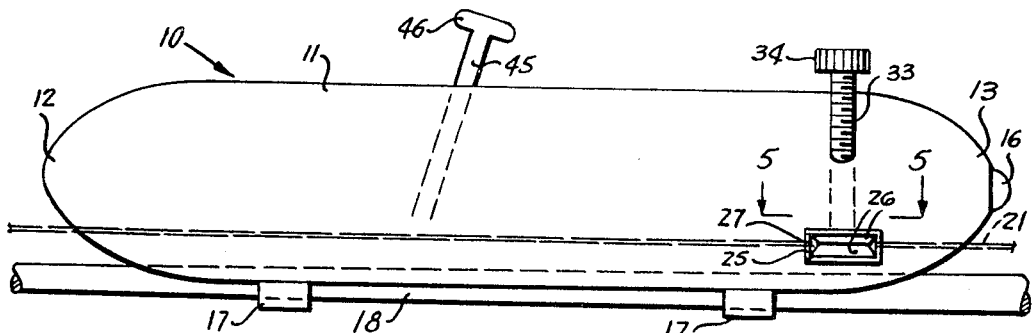
FIG. 2 is an enlarged bottom elevational view of the device of FIG. 1.
Figures 4, 5:
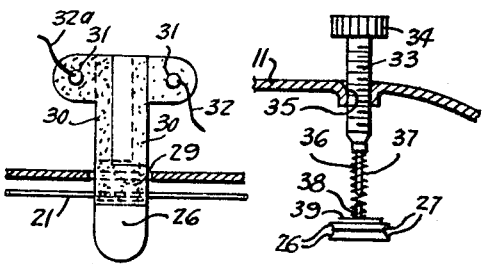
FIG. 4 is an enlarged detail sectional view showing the adjusting means for the device.
FIG. 5 is an enlarged sectional view showing one form of switch means taken substantially along the line 5—5 of FIG. 2 as viewed in the direction indicated by the arrows.
Figure 8:
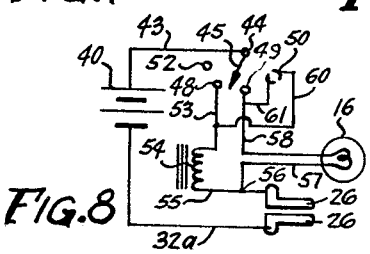
FIG. 8 is a diagrammatic view showing the circuit of the device.

The bottom of the casing, on the side adjacent the clips is provided with a slot 25 through which project a pair of depending contact members 26. The contact members are substantially identical but opposite, and are provided with convergingly beveled bottom and side edges 27 as best shown in FIGS. 2 and 4. Each contact member 26 is provided on its inner side with a transverse strip 29 of chrome plated copper clad printed circuit board material, and from the opposite transverse strips similar longitudinal strips 30 lead upwardly on each contact on opposite sides thereof to terminals 31 from which extend wires 32. The arrangement is thus such that when the two confronting contact strips engage each other a circuit is closed in a manner and for a purpose to be hereinafter described. When the line 21 is interposed between the strips as shown in FIG. 1, the strips are maintained in spaced relation, and so remain until the line is pulled to the dotted line of FIG. 1 by the strike of the fish on the hook, at which time the contacting strips close the circuit. Tension on the strips may be adjusted by means of an adjusting screw 33, as shown in FIG. 4, which is provided with a knurled head 34 and which extends through a threaded opening 35 in the wall of casing 11. The end of the screw 33 carries a pin 36 which centers a light compression spring 37, the other end of which engages in a stud 38 on a plate 39 in abutting relation with one of the contact members 26. Obviously varying the tension on the spring will vary the tension required to separate the contacts, or the force or strength with which they hold the line 21.

Figure 3:
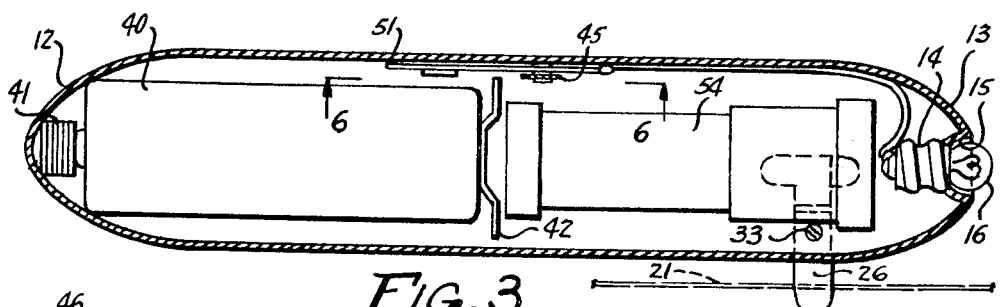
FIG. 3 is a sectional view taken substantially along the center line of the device.

As shown in the circuit diagram, the wire from either of the contacts 26, which is here designated as 32a extends to a battery 40 contained within the casing. Battery 40 is mounted as best shown in FIG. 3 between contacting support members 41 and 42. From the other side of the battery a wire 43 extends to a terminal 44 of a pivoted switch arm 45. The switch arm is provided with a head 46 which extends outwardly through the side wall of the casing and is selectively adjustable into an "off" position, as indicated in dotted lines in FIG. 6, or into a selected one of three "on" positions. The arm 45 is constructed of spring steel and is curved as at 47 (see FIG. 7) to provide secure engagement with one of a plurality of contacts 48, 49 or 50 which may be carried by or printed on a printed circuit board 51 on the interior of the casing. While wires have been herein referred to in several instances, it will be understood that much of the circuitry may be printed in accordance with conventional modern practice. When the switch arm is in the dotted line position shown it engages a dead contact button 52 and the apparatus is open or "off" position. However, from the contact 48 a line 53 extends to a buzzer or audible signal 54, or any desired conventional type also contained within the casing, and from the opposite terminal of which a wire 55 extends to the other of contacts 26. Thus with the contact arm 45 in electrical connection with contact 48, the buzzer is actuated whenever the strips 29 are in contact with each other.

Figures 6, 7:
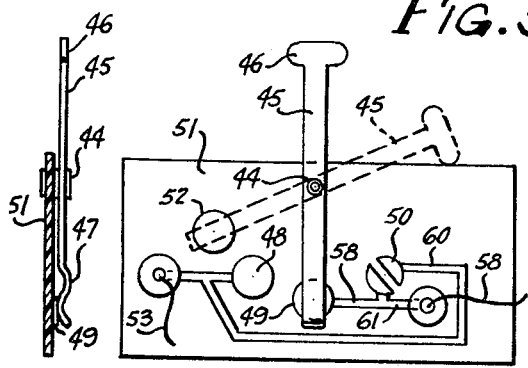
FIG. 6 is a sectional view taken substantially along the line 6—6 of FIG. 3 showing the selector switch.
FIG. 7 is a sectional view showing the general configuration of the switch arm as shown in FIG. 6.

From a terminal 56 in line 55 a line 57 leads to bulb 16, from which a second line 58 extends to terminal 49, so that when the switch arm 45 is in contact with the button 49 the light is illuminated when the strips 29 are engaged. Contact 50 is split, as shown in FIG. 6, and from one half of the split contact a line 60 extends to a junction with the line 53 while from the other half thereof a line 61 extends to a junction with the line 58. Thus when the contact arm 45 engages contact 50 both the buzzer and the light are simultaneously actuated, to attract the attention of the fisherman.

Figure 9:
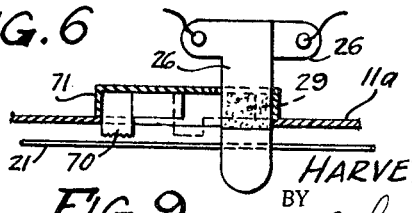
FIG. 9 is a fragmentary sectional view showing a modified form of switch construction.

FIG. 9 discloses a simpler and less expensive form of "on" and "off" switch, which is directly connected to both the audible and visible signals, so that when the line is moved to permit the contact strips 29 to engage, a circuit to both audible and visible signals is established. In this modification the switch consists of a plastic slide switch including a button 70 which is slidable in a groove formed in a casing 11a which is otherwise identical to the casing 11, the button containing a thin laterally extending strip 71 of insulating material, which is of a thickness when inserted between the contact members 26, to separate the strips 29 thus effectively breaking the circuit until such time as the plastic slide is oppositely moved.

This modification may be less expensively manufactured than that of the previously described form of the invention; however, it lacks the versatility and selectivity of the previously shown form.

From the foregoing it will now be seen that there is herein provided an improved fishing alarm which accomplishes all of the objects of this invention, and others, including many advantages of great practical utility and commercial importance.

As many embodiments may be made of this inventive concept and as many modifications may be made in the embodiments hereinbefore shown and described, it is to be understood that all matter herein is to be interpreted merely as illustrative and not in a limiting sense.

I claim:

An alarm for a fishing pole comprising a casing having a threaded bore therein, resilient clip means adapted to connect said casing to a fishing pole, a battery in said casing, an audible signal means carried by said casing, a visual signal means carried by said casing, a circuit from said battery to said audible and visual signal means, a manual switch for closing and opening said circuit, a pair of normally engaging, resilient, flat contact members mounted in said casing, extending from said casing through an aperture provided therein and interposed in said circuit, said contact members having opposed areas of electric conductive material on their confronting faces, said faces having pressure adjusting means therefor, said pressure adjusting means comprising, in direct vertical alignment with both said contact members, the threaded bore in said casing, a headed screw engaged with the threads in said bore, a compression spring of lesser diameter than said screw and interposed between said screw and said contact members to give varying degrees of tension to said contact members as said screw is rotated, said contact members being adapted to receive a fishing line therebetween holding them separated, whereby a pull on the fishing line removes the same from said contacts permitting them to engage and close said circuit.

References Cited by the Examiner

UNITED STATES PATENTS

| 2,741,055 | 4/1956 | Weber | 43—17 |
| 2,922,243 | 1/1960 | Weaver et al. | 43—17 |
| 2,986,835 | 6/1961 | Ordinetz et al. | 43—17 |
| 3,064,244 | 11/1962 | McCreary et al. | |

FOREIGN PATENTS 616,571   8/1935   Germany.

ABRAHAM G. STONE, *Primary Examiner.*

SAMUEL KOREN, *Examiner.*

R. L. HOLLISTER, *Assistant Examiner.*